US012712266B2

(12) United States Patent
Himath et al.

(10) Patent No.: US 12,712,266 B2
(45) Date of Patent: Aug. 18, 2026

(54) RADIATION ELEMENT HAVING RADIATION ARMS WITH SHUNT FILTERS AND ANTENNA THAT INCLUDES THE RADIATION ELEMENT

(71) Applicants: PROSE TECHNOLOGIES (SUZHOU) CO., LTD., Suzhou (CN); PROSE TECHNOLOGIES LLC, Mount Olive, NJ (US)

(72) Inventors: Priyananda Himath, Northmead (AU); Zhonghao Hu, Suzhou (CN); Darmawirya Daniel, Northmead (AU); Devasia Joseph, Northmead (AU); Jing Sun, Suzhou (CN); Ping Huang, Suzhou (CN); Kuigen Cao, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 155 days.

(21) Appl. No.: 18/588,620

(22) Filed: Feb. 27, 2024

(65) Prior Publication Data

US 2024/0204408 A1 Jun. 20, 2024

Related U.S. Application Data

(63) Continuation of application No. PCT/CN2022/077197, filed on Feb. 22, 2022.

(30) Foreign Application Priority Data

Aug. 27, 2021 (CN) ......................... 202110996693.4

(51) Int. Cl.
*H01Q 5/48* (2015.01)
*H01Q 1/24* (2006.01)
(Continued)

(52) U.S. Cl.
CPC ............... *H01Q 5/48* (2015.01); *H01Q 1/246* (2013.01); *H01Q 1/38* (2013.01); *H01Q 1/521* (2013.01); *H01Q 21/26* (2013.01)

(58) Field of Classification Search
CPC ............ H01Q 1/246; H01Q 1/50; H01Q 1/52; H01Q 1/521; H01Q 1/523; H01Q 1/525;
(Continued)

(56) References Cited

U.S. PATENT DOCUMENTS

2018/0323513 A1* 11/2018 Varnoosfaderani .......................... H01Q 21/062
2020/0373668 A1* 11/2020 Wu ........................ H01Q 9/285

FOREIGN PATENT DOCUMENTS

CN 104106179 A 10/2014
CN 110741508 A 1/2020
(Continued)

OTHER PUBLICATIONS

The World Intellectual Property Organization (WIPO) International Search Report for PCT/CN2022/077197 Apr. 28, 2022 6 Pages (including translation).

*Primary Examiner* — Robert Karacsony
(74) *Attorney, Agent, or Firm* — ANOVA LAW GROUP, PLLC

(57) ABSTRACT

A radiation element includes: two or more radiation arms; two or more power feeders for respectively feeding the two or more radiation arms; and a filter, configured between the two or more radiation arms and the two or more power feeders. An antenna includes a first radiation unit that includes the radiation element, a second radiation unit that includes a high-frequency radiating element, and a reflection plate. The first radiation unit and the second radiation unit are configured on the reflection plate. In a direction perpen-
(Continued)

dicular to the reflection plate, the radiation element and the high-frequency radiating element at least partially overlap.

20 Claims, 10 Drawing Sheets

(51) Int. Cl.

| | |
|---|---|
| ***H01Q 1/38*** | (2006.01) |
| ***H01Q 1/52*** | (2006.01) |
| ***H01Q 21/26*** | (2006.01) |

(58) Field of Classification Search

CPC .......... H01Q 5/314; H01Q 5/321; H01Q 5/40; H01Q 5/48; H01Q 9/16; H01Q 9/26; H01Q 9/265; H01Q 9/28; H01Q 9/285; H01Q 21/062; H01Q 21/24; H01Q 21/26

See application file for complete search history.

(56) References Cited

FOREIGN PATENT DOCUMENTS

| | | | |
|---|---|---|---|
| CN | 111864367 | A | 10/2020 |
| CN | 112821044 | A | 5/2021 |
| CN | 113690592 | A | 11/2021 |
| JP | 2007214509 | A | 8/2007 |
| WO | 2020197849 | A1 | 10/2020 |
| WO | 2021133577 | A1 | 7/2021 |
| WO | 2021136187 | A1 | 7/2021 |

* cited by examiner

RADIATION ELEMENT HAVING RADIATION ARMS WITH SHUNT FILTERS AND ANTENNA THAT INCLUDES THE RADIATION ELEMENT

RELATED APPLICATIONS

This application is a continuation application of PCT Patent Application No. PCT/CN2022/077197, filed on Feb. 22, 2022, which claims priority to Chinese Patent Application No. 202110996693.4 filed with the National Intellectual Property Administration, People's Republic of China on Aug. 27, 2021, all of which are incorporated herein by reference in entirety.

FIELD OF THE TECHNOLOGY

The present disclosure relates to the field of wireless communication, in particular to a radiation element and an antenna including the radiation element.

BACKGROUND

Base station antennas for 3G, LTE or 5G communications include arrays of multiple radiation elements operating in different frequency bands. The broad spectrum between 400 MHz and 6 GHz (the so-called sub-6 GHZ band) is allocated to telecom operators for wireless communications. It may be challenging to design analog components for such a wide bandwidth, such as designing filters, phase shifters, radiation elements or amplifiers, or the like, such that the frequency band below 6 GHz will be further divided into several sub-bands, and operations are fun separately, to facilitate the design of corresponding analog components. For example, the industry usually divides the frequency band below 6 GHz into the following four separate working sub-bands, that is, the first sub-band is 600 MHz to 1 GHz, the second sub-band is 1.4 GHz to 3 GHZ, and the third sub-band is 3 GHz to 4.2 GHZ, the fourth sub-band is 5 GHz to 6 GHz.

These four separate frequency bands may require separate components such as filters, phase shifters, amplifiers, and radiation elements. It may be desirable for these components not to interfere with each other, that the minimum isolation is around 20 dB, and that the isolation between each signal channel is 30 dB. These desirables may be achieved for shielded channels such as filters and phase shifters. In these channels, all signals are shielded by microstrip lines or strip lines.

However, since radiation elements operating at different frequency bands are easily coupled, it may be difficult to achieve isolation between radiation elements. If the isolation does not reach a certain level, there may be pattern distortion and isolation problems between ports. These complications may degrade the performance of the communication network. If the distance between two adjacent radiating elements operating in different frequency bands is increased, the isolation performance between two adjacent radiating elements operating in different frequency bands may be improved. However, such setting may increase the width or length of the antenna, which is not conducive to the miniaturization of the antenna.

On the other hand, due to the need to cover multiple frequency bands and sectors, and the space for installing antennas on base station towers is very limited, manufacturers need to integrate multiple radiating elements working in different frequency bands into one antenna. This makes the isolation between multiple radiating elements operating in different frequency bands a greater challenge.

SUMMARY

In certain embodiment(s), the present disclosure provides a radiation element for the low-frequency band, which imparts minimal interference to a high-frequency radiating element, so that the radiation element may be combined with the high-frequency radiating element when desirable, without having to adversely affect the high-frequency vibrator. Moreover, and in certain embodiment(s), the radiation element for the low-frequency band has a relatively lower return loss and a relatively better radiation pattern.

In one aspect, the present disclosure provides a radiation element, which includes: two radiation arms; two power feeders for respectively feeding the radiation arms; and a filter, configured between the two or more radiation arms and the two or more power feeders.

Due to the employment of a filter, the high-frequency current formed by the high-frequency signal at the radiation element may be filtered out, thereby reducing the interfering effect of the radiation element on the high-frequency radiating element, improving the coexistence and mutual anti-interference between the radiation element and the high-frequency radiating element according to the present disclosure.

In certain embodiment(s), the two or more radiation arms include a first radiation arm and a second radiation arm, and the filter includes a first transmission line feeding the first radiation arm and a second transmission line feeding the second radiation arm.

In certain embodiment(s), at least one of the first transmission line the second transmission line is not less than ⅛ of a highest frequency wavelength at a high-frequency band.

In certain embodiment(s), the radiation element further includes a medium panel, supporting the two or more radiation arms.

In certain embodiment(s), the radiation element further includes a medium panel; and a shunt filter, where the shunt filter includes a third trace configured on one side of the medium panel and a fourth trace configured on an opposing side of the medium panel.

In certain embodiment(s), the third trace and the fourth trace each include an intersection area and a non-intersection area, and the intersection areas of the third trace and the fourth trace form a capacitor.

In certain embodiment(s), a width of the intersection area of the third trace or the fourth trace is not less than 0.5 mm.

In certain embodiment(s), a width of at least one of the third trace and the fourth trace is smaller than a width of any one of the two or more radiation arms.

In certain embodiment(s), a dimension of the radiation element is not greater than ⅓ of a center frequency wavelength of a low-frequency band.

In certain embodiment(s), the radiation arms include a first radiation arm and a second radiation arm, and the shunt filter is positioned between the first radiation arm and the second radiation arm.

In certain embodiment(s), the two or more radiation arms include a first radiation arm and a third radiation arm, and the radiation element further includes: a medium panel; and a second radiation arm position between the first radiation arm and the third radiation arm, the first radiation arm and the third radiation arm being configured on a first side of the medium panel, and the second radiation arm being configured on a second side of the medium panel, the second side opposing the first side.

In certain embodiment(s), the two or more radiation arms include a first radiation arm and a third radiation arm, and the radiation element further includes: a medium panel; and a second radiation arm, where the first radiation arm, the second radiation arm, and the third radiation arm are configured on a same side of the medium panel.

In certain embodiment(s), a width of any one of the two or more radiation arms is not greater than ⅛ of the highest frequency wavelength of a high-frequency band.

In certain embodiment(s), the power feeders and the radiation arms together define a hollow portion.

In certain embodiment(s), at least one of the two or more power feeders includes a bridge.

In certain embodiment(s), a length of the bridge is not greater than ¼ of a highest frequency wavelength of a high-frequency band.

In another aspect, the present disclosure provides an antenna, which includes: a first radiation unit, including a radiation element according to claim 1; second radiation unit, including a high-frequency radiating element, a working frequency of the high-frequency radiating element is higher than a working frequency of the radiation element; and a reflection plate, the first radiation unit and the second radiation unit being configured on the reflection plate, where, in a direction perpendicular to the reflection plate, the radiation element and the high-frequency vibrator at least partially overlap.

In certain embodiment(s), in a lateral direction of the reflection plate, the radiation element overlaps with the high-frequency radiating element.

In certain embodiment(s), the high-frequency radiating element is a first high-frequency radiating element, and the second radiation unit further includes a second high-frequency radiating element, and where, in a lateral direction of the reflection plate, two sides of the radiation element at least partially overlap with the first and the second high-frequency radiating elements, respectively.

In certain embodiment(s), a width of the reflector plate in a lateral direction is not greater than the lowest frequency wavelength of a low-frequency band.

In certain embodiment(s), the second radiation unit includes a first high-frequency radiating element and a second high-frequency radiating element working at a high-frequency band, and where, in a lateral direction of the reflection plate, a center-to-center distance between the first and the second high-frequency radiating elements is not greater than the highest frequency wavelength in a high-frequency band. In some embodiments, the first and the second high-frequency radiating elements are neighboring radiating elements.

In certain embodiment(s), the second radiation unit includes a first high-frequency radiating element and a second high-frequency radiating element working at a high-frequency band, and where, in the longitudinal direction of the reflection plate, a center-to-center distance between the first and the second high-frequency radiating elements is not greater than ¾ of the highest frequency wavelength of a high-frequency band. In some embodiments, the first and the second high-frequency radiating elements are neighboring radiating elements.

In certain embodiment(s), the second radiation unit includes a first high-frequency radiating element and a second high-frequency radiating element working at a high-frequency band, and where a center frequency wavelength of a high-frequency band is $\lambda$, and in a lateral direction of the reflection plate, a center-to-center distance between the first and the second high-frequency radiating elements is between $0.6\lambda$ and $\lambda$. In some embodiments, the first and the second high-frequency radiating elements are neighboring radiating elements.

In the radiation element according to certain embodiment(s) of the present disclosure, due to the employment of a filter, the high-frequency current formed by the high-frequency signal at the radiation element may be filtered out, thereby reducing the interfering effect of the radiation element on the high-frequency radiating element, improving the coexistence and mutual anti-interference between the radiation element and the high-frequency radiating element according to the present disclosure. With the radiation element according to certain embodiment(s) of the present disclosure, the interference to other radiation elements may be minimized based on realizing the radiation performance of the radiation element itself, such that an optimal design of the multi-band combination antenna may be realized.

BRIEF DESCRIPTION OF THE DRAWINGS

Below is a description of certain embodiments with reference to the accompanying drawings, where characteristics, technical features, advantages and implementation methods are further described.

DETAILED DESCRIPTION

Figure 1:
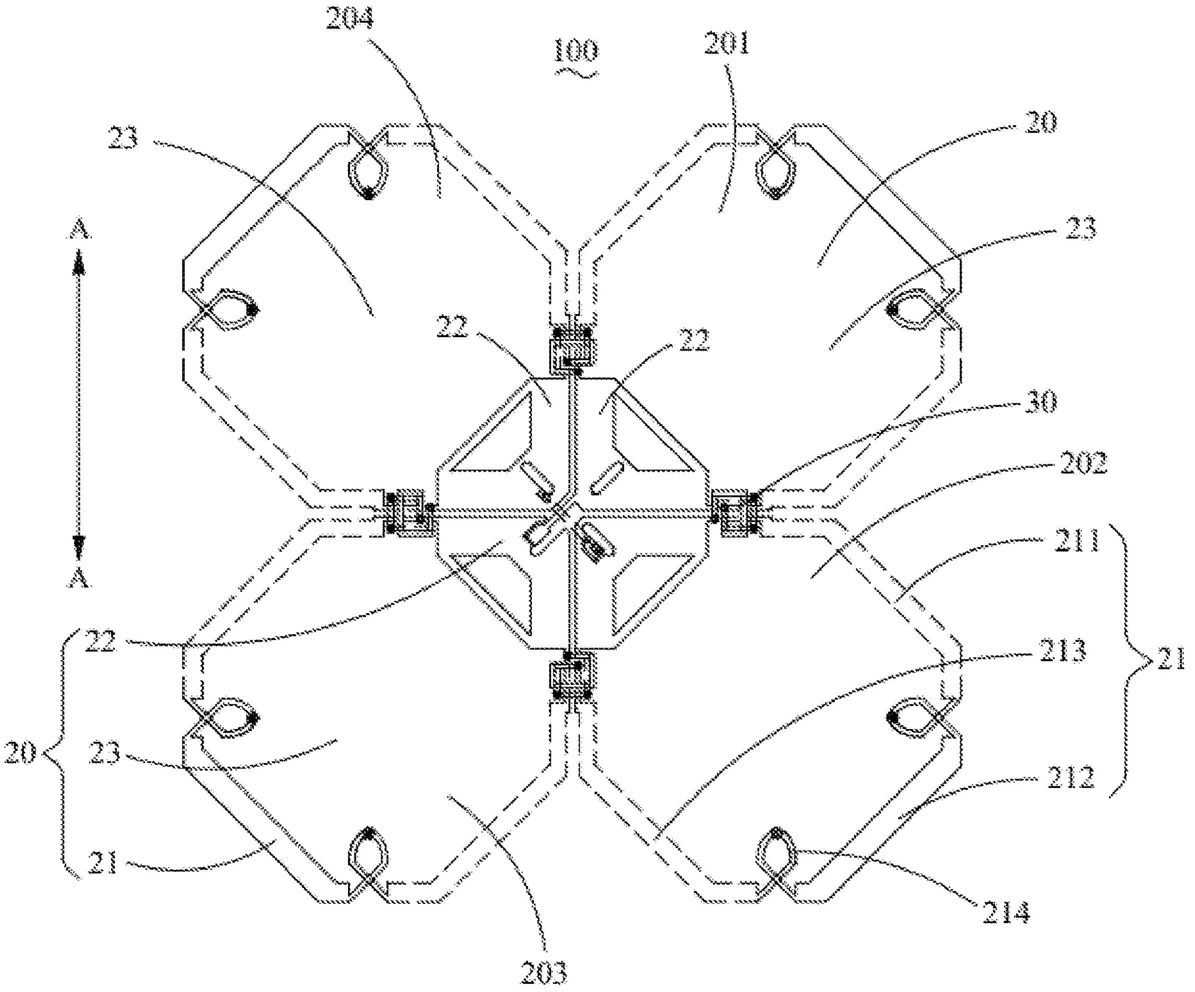
FIG. 1 is a schematic plan view of a radiation element 100 according to certain embodiment(s) of the present disclosure when the medium panel 10 is removed, where structures represented by solid lines and broken lines are respectively configured on different sides of the medium panel.

For purposes of illustration rather than limitation, details such as details on system architectures and techniques are set forth in the following description to assist with understanding of certain embodiments of the present disclosure. However, the present disclosure may be practiced without having to comply with one or more of the details. In certain embodiment(s), detailed descriptions of well-known components, circuits, devices, systems, and methods may rather be omitted for brevity.

As may be employed in the present disclosure and the appended claims, the term "comprising" indicates the presence of described features, integers, steps, operations, elements and/or components, but does not exclude the presence or addition of one or more other features, integers, steps, operations, elements, components and/or assemblies.

To keep the drawings concise, each drawing may only schematically show the parts related to the present disclosure, and they do not necessarily represent an actual structure of the product. In addition, to make the drawings concise and easy to understand, in some drawings, only one of the components having the same structure or function may be schematically shown or only one of them is marked. In certain embodiment(s) of the present disclosure, "one" not only means "only one", but also means "more than one."

As may be employed in the present disclosure and the appended claims, the term "and/or" refers to any combination of one or more of the associated listed items and all possible combinations, and includes these combinations. In addition, as may be employed in the present disclosure and the appended claims, the terms "first", "second" and the like are only used to distinguish descriptions, and cannot be understood as indicating or implying relative importance.

To more clearly illustrate the embodiments of the present disclosure, certain implementation manners of the present disclosure are described below with reference to the accompanying drawings. The accompanying drawings are directed to certain embodiments of the present disclosure, and those skilled in the art may obtain other implementations according to the accompanying drawings.

The present disclosure reflects a realization that interference is present between certain low-frequency radiation element and high-frequency radiating element, so that a sufficient distance may be needed between the low-frequency radiation element and the high-frequency radiating element, to reduce the signal interference between the low-frequency radiation element and the high-frequency radiating element to meet certain requirements for separation. Such a distance may not be favorable for certain designs of multi-band compact antenna.

According to the realization reflected in the present disclosure, due to the longer wavelength of the radiation element at the low-frequency band, shape and height of the low-frequency radiation element are respectively larger and higher than that of the high-frequency radiating element. Therefore, when the low-frequency radiation element and the high-frequency radiating element are placed side by side on a common reflector, the low-frequency radiation element often blocks the high-frequency radiating element. Such interference may intensify when the installation space is limited. Depending on the geometry of the low-frequency radiation element, the energy radiated by the high-frequency radiating element may be diffracted or cause resonance on the low-frequency radiation element. Both of such mechanisms may lead to distortion of the far-field mode of the high-frequency radiating elements. The present disclosure in certain embodiment(s) advantageously employs a filter to be provided on the low-frequency radiation element to reduce or eliminate any undesired high-frequency current on the low-frequency radiation element. In certain embodiment(s), the low-frequency radiation element is designed to have a thin metal profile and have a large hollow part inside to allow the signal radiated by the high-frequency radiating element to pass through with minimal diffraction.

In certain embodiment(s), the present disclosure advantageously provides a radiation element, which may be used at a low-frequency band, and which reduces or minimizes the interference to the high-frequency radiating element, so that the radiation element may be readily combined with the high-frequency radiating element without having to cause adverse effect on the high-frequency radiating element. In certain embodiment(s), the radiation element for the low-frequency band has a relatively smaller return loss and a relatively better radiation pattern.

Figure 2:
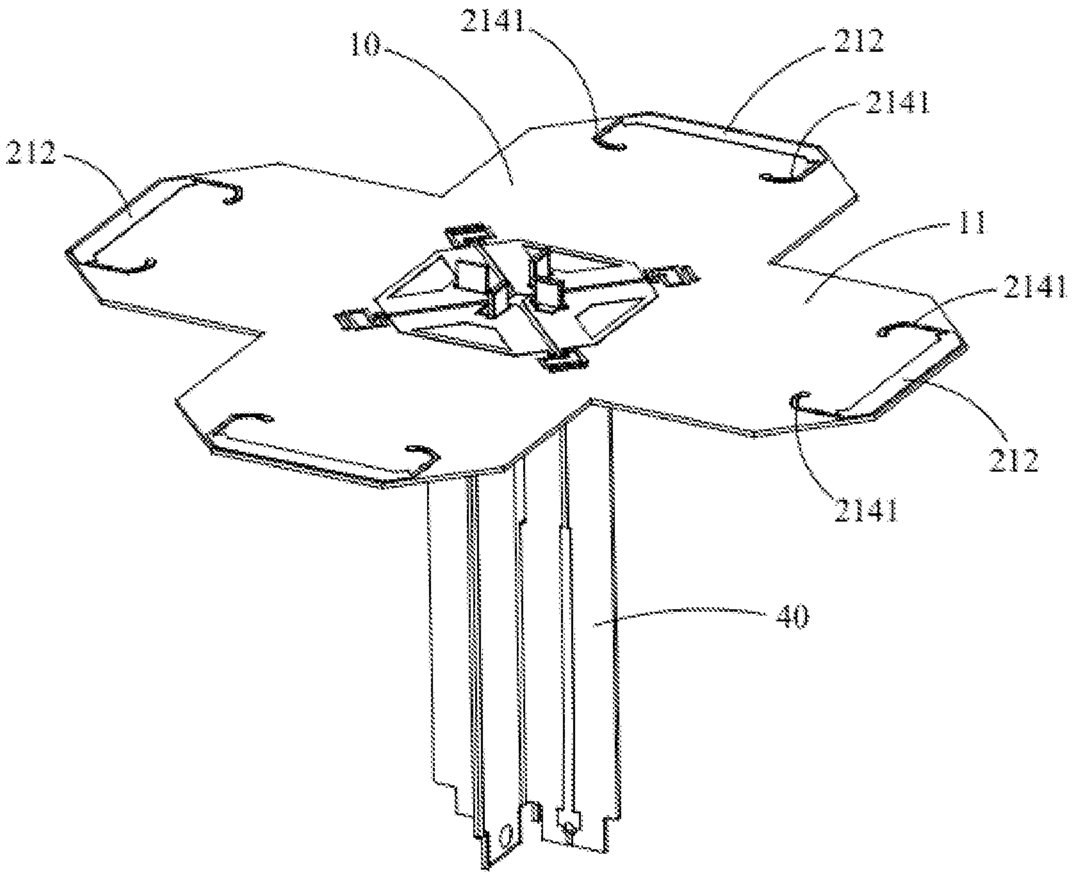
FIG. 2 is a schematic perspective view of a combination of the radiation element 100 shown in FIG. 1 and a balun 40, according to certain embodiment(s) of the present disclosure.
Figure 3:
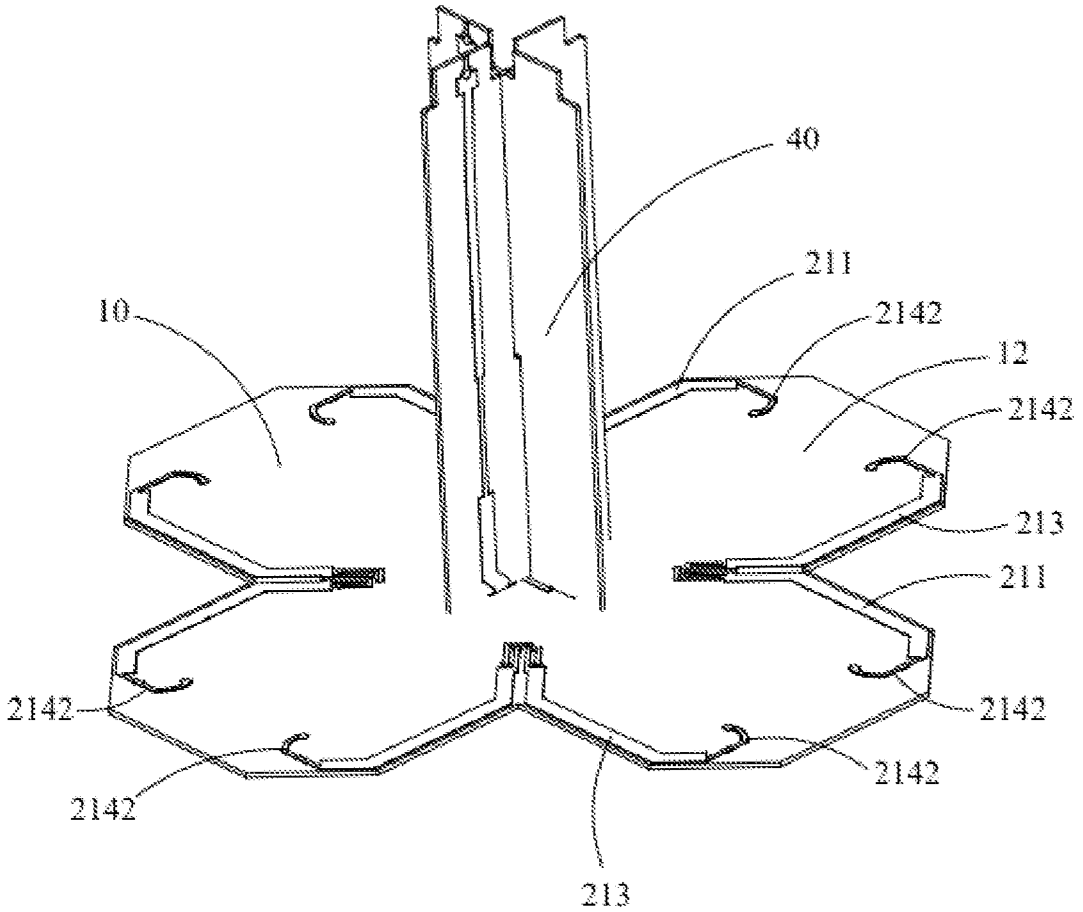
FIG. 3 is a schematic perspective view of FIG. 2, from another angle of FIG. 2, according to certain embodiment(s) of the present disclosure.

Referring to FIG. 1 and FIG. 2 and FIG. 3, a radiation element 100 according to certain embodiment(s) of the present disclosure includes a medium panel 10, a radiation area 20 configured on the medium panel 10 and a filter 30 configured on the medium panel 10. In certain embodiment(s), the medium panel is a dielectric board. In certain embodiment(s), the filter 30 is a common-mode filter. The medium panel 10 includes a first side 11 and a second side 12. In certain embodiment(s), the second side is parallel to the first side 11. The radiation area 20 may include any suitable number of areas, and for example, the quantity of the radiation area 20 is 4, which are radiation area 201, radiation area 202, radiation area 203 and radiation area 204. The radiation areas 201, 202, 203, and 204 are respectively constructed in one quadrant of the four-quadrant coordinate system, and before the balun 40 (as shown in FIG. 2) is connected, direct current is blocked between two adjacent radiation areas 20. In certain embodiment(s), the balun 40 is a feed balun. The radiation area 201 and the radiation area 203 form a dipole with a polarized direction of +45°; the radiation area 202 and the radiation area 204 form another dipole with a polarized direction of −45°. Each radiation area 20 includes a radiation arm 21, a power feeder 22 for feeding the radiation arm 21, and a hollow portion 23. The radiation arm 21 may include any suitable number of radiation arms, and in certain embodiment(s), the radiation arm 21 includes a first radiation arm part 211, a second radiation arm part 212, a third radiation arm part 213, and a shunt filter 214. The first radiation arm part 211 and the third radiation arm part 213 are configured on the first side 11 of the medium panel 10, and the second radiation arm part 212 is configured on the second side 12 of the medium panel 10. In certain embodiment(s), the number of the shunt filters 214 is two. One shunt filter 214 is configured between the first radiation arm part 211 and the second radiation arm part 212. Another shunt filter 214 is configured between the second radiation arm part 212 and the third radiation arm part 213. Since the radiation arm 21 is divided into three shorter radiation arm parts (namely the first radiation arm part 211, the second radiation arm part 212, and the third radiation arm part 213) by the shunt filters 214, the resonance between the radiation element 100 and high frequency signals may be reduced. In certain embodiment(s), a width of at least one of the first radiation arm part 211, the second radiation arm part 212, and the third radiation arm part 213 is not greater than ⅛ of the highest frequency wavelength of the high frequency band.

Figure 4:
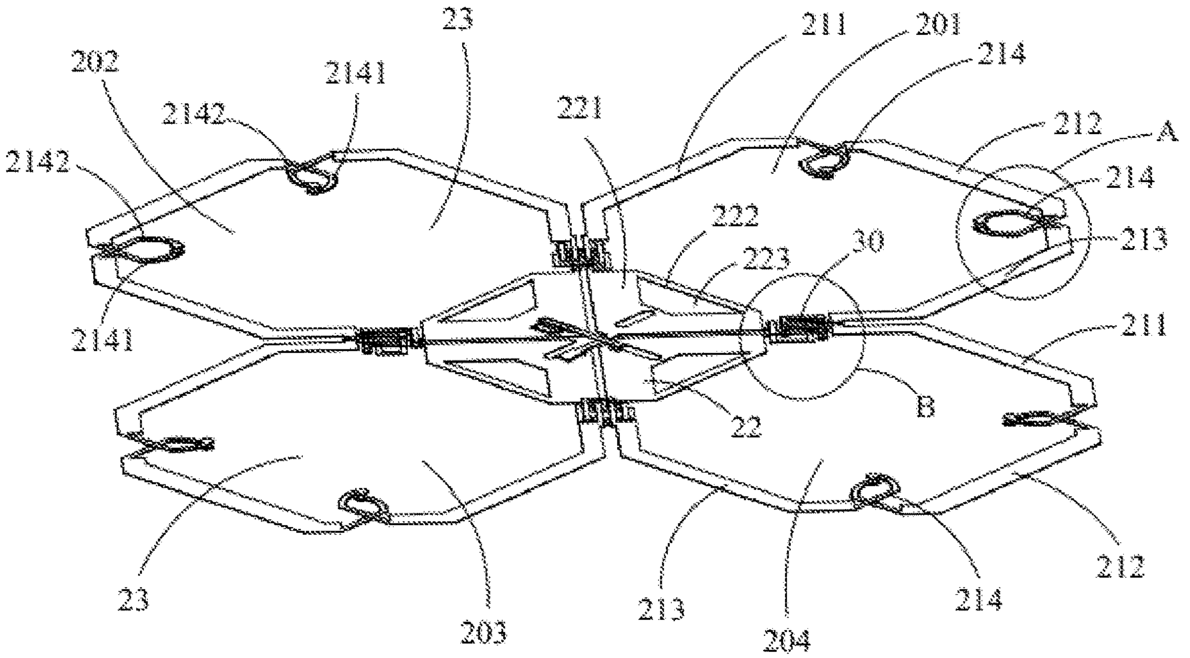
FIG. 4 is a schematic perspective view of the radiation element 100 shown in FIG. 1 when the medium panel 10 is removed, according to certain embodiment(s) of the present disclosure.
Figure 7:
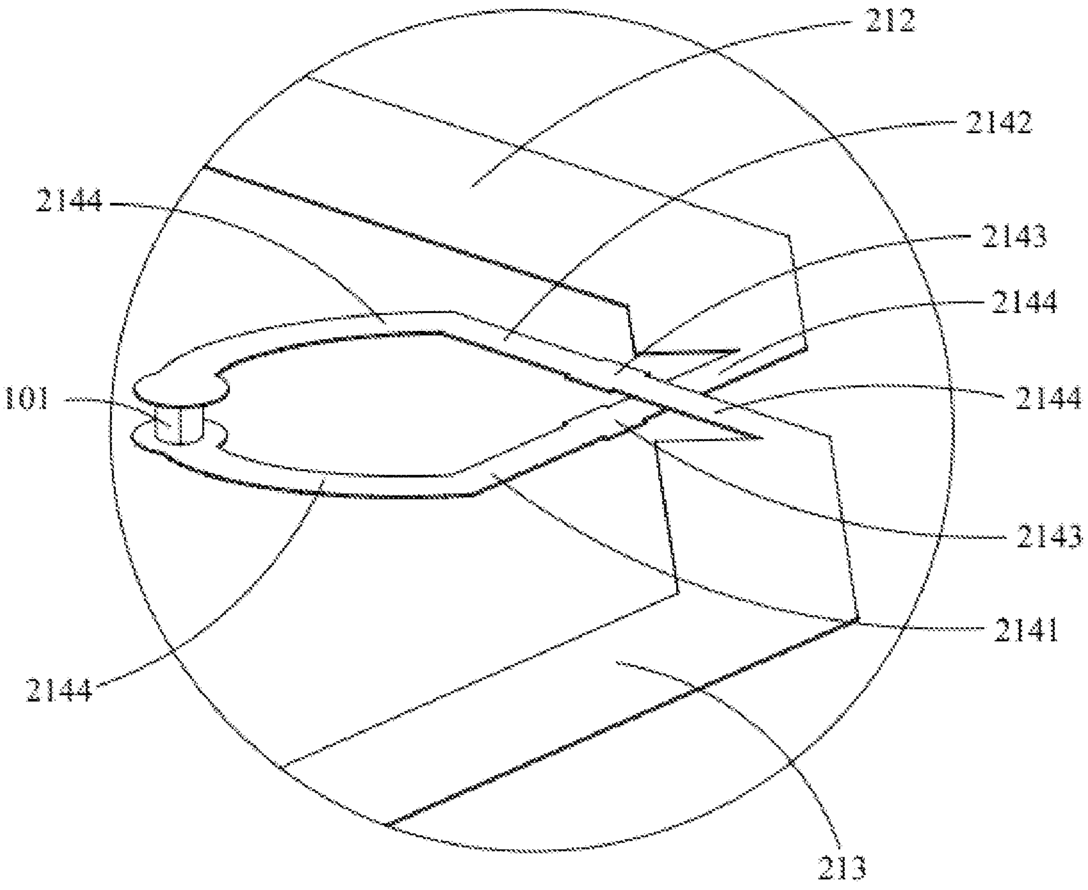
FIG. 7 is a partially enlarged schematic view of circle A in FIG. 4, according to certain embodiment(s) of the present disclosure.
Figure 8:
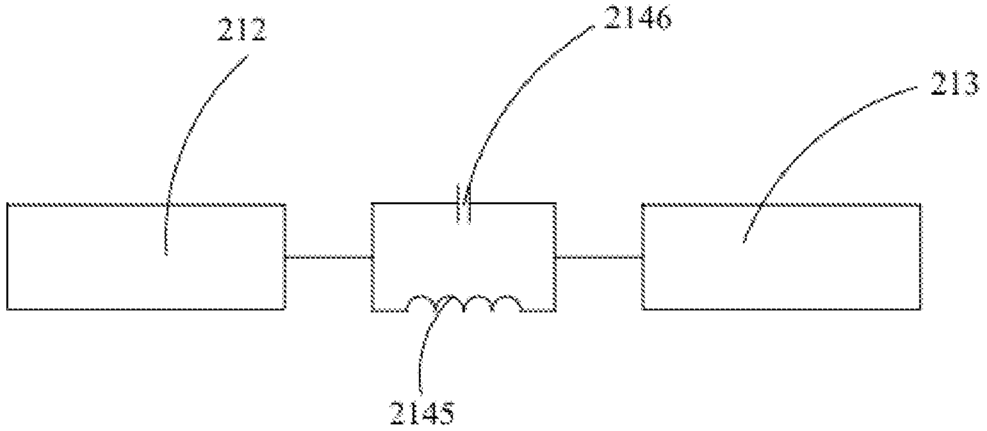
FIG. 8 is a schematic equivalent circuit diagram of a shunt filter, according to certain embodiment(s) of the present disclosure.

FIG. 7 is a partially enlarged view of circle A in FIG. 4. Referring to FIG. 7, shunt filter 214 includes a third trace 2141 located on the first side 11 of the medium panel 10 and a fourth trace 2142 located on the second side 12 of the medium panel 10. One end of the third trace 2141 is electrically connected to the second radiation arm part 212, and the other end is electrically connected to the fourth trace 2142 via a conducting hole 101. The conducting hole 101 may be a metal conductor configured on the medium panel 10, or a plated metal layer configured inside of a through hole of the medium panel 10. An end of the fourth trace 2142 away from the conducting hole 101 is electrically connected to the third radiation arm part 213. The third trace 2141 and the fourth trace 2142 are bent together to form an inductance coil, so that the high-frequency current in the radiation element 100 may be contained. The high-frequency current is generated after the high-frequency signal radiated by the high-frequency radiating element resonates with the radiation element 100. Referring to FIG. 7, the third trace 2141 and the fourth trace 2142 intersect three-dimensionally. The third trace 2141 and the fourth trace 2142 each include an intersection area 2143 and a non-intersection area 2144. Intersection area 2143 of the third trace 2141 and intersection area 2143 of the fourth trace 2142 together form a capacitor. FIG. 8 schematically depicts an equivalent circuit diagram of the shunt filter 214, where the third trace 2141 and the fourth trace 2142 jointly form an inductance coil 2145, and where the intersection area 2143 of the third trace 2141 and the intersection area 2143 of the fourth trace 2142 jointly form a capacitor 2146. After the inductance coil 2145 and the capacitor 2146 are connected in parallel, they are connected in series with the second radiation arm part 212 and the third radiation arm part 213. Since the shunt filter 214 delivers the effect of both the inductance coil 2145 and the capacitor 2146 at the same time, the shunt filter 214 can not only contain the high-frequency current flowing in the radiating unit 100, but also consume the energy of the high-frequency current, thereby avoiding the interference of the radiation element 100 on the high-frequency radiating element. In certain embodiment(s), the inductance coil 2145 is 20 nH, and the capacitor is 0.4 pF, which are suitable for providing a filter stopband at 1.8 GHz. In certain embodiment(s), the sizes of the inductance coil 2145 and the capacitor 2146 may be adjusted as suitable. For example, the inductance coil 2145 may be adjusted by modifying a total length of the third trace 2141 and the fourth trace 2142, and the capacitor 2146 may be adjusted by modifying the size of the intersection are 2143. In certain embodiment(s), the inductance coil 2145 is an inductor.

In this embodiment, in a direction perpendicular to an extension direction of first inductance trace 2141 or second inductance trace 2142, a width of an intersection region 2143 is greater than a width of the non-intersection region 2144. To further improve the filtering effect of the shunt filter 214, it is usually desirable to use a larger inductor with a smaller capacitor to increase the filtering bandwidth. In certain embodiment(s), a width of the intersection area 2143 is smaller than a width of the non-intersection area 2144. In certain embodiment(s), the width of the intersection region 2143 is not less than 0.5 mm (millimeter). In certain embodiment(s), the width of the intersection region 2143 is not greater than ⅛ of the highest frequency wavelength of the high frequency band. Further, the width of the third trace 2141 and the fourth trace 2142 is smaller than the width of the radiation arm 21, that is, the width of the third trace 2141 and the fourth trace 2142 is each smaller than a width of the first radiation arm part 211, smaller than a width of the second radiation arm part 212, and smaller than a width of the third radiation arm part 213. In certain embodiment(s), the width of the third trace 2141 and the fourth trace 2142 is each greater than the width of the radiation arm 21.

In certain embodiment(s), the first radiation arm part 211 and the third radiation arm part 213 are configured on the first side 11 of the medium panel 10, the second radiation arm part 212 is configured on the second side 12 of the medium panel 10. In certain embodiment(s), the first radiation arm part 211, the second radiation arm part 212 and the third radiation arm part 213 may also be configured on the same side of the medium panel 10. For example, the first radiation arm part 211, the second radiation arm part 212, and the third radiation arm part 213 are all configured on the first side 11 of the medium panel 10, and at this time, the fourth trace 2142 is electrically connected to the third radiation arm part 213 through the conducting hole.

Referring to FIG. 1, FIG. 2 and FIG. 4, the power feeder 22 is used to feed power to the radiation arm 21. The power feeder 22 includes a base 221, a bridge 222 and a hollow portion 223 between the base 221 and the bridge 222. Base 221 is electrically connected to the balun 40 (as shown in FIG. 2) to obtain the signal fed by the balun 40. In this embodiment, the balun 40 includes two mutually orthogonal dielectric boards, one side of the dielectric board is provided with a ground wire, and the other side is provided with a signal wire. In certain embodiment(s), the ground wire is electrically connected to one radiation area of the dipole, and the signal wire is electrically connected to another radiation area of the dipole. Bridge 222 is used to reduce a return loss of radiation element 100. In certain embodiment(s), the length of bridge 222 is not greater than ¼ of the highest frequency wavelength of the high frequency band. The hollow portion 223 is located between the base 221 and the bridge 222, which may reduce a metal overlapping area between the radiation element 100 and the high-frequency radiating element, thereby reducing the diffraction when the high-frequency signal passes through the radiation element 100, and thereby reducing the interference of the radiation element 100 on the high-frequency radiating element.

Referring to FIG. 1 and FIG. 4, the hollow portion 23 is located between the radiation arm 21 and the power feeder 22. Since the area of the radiation arm 21 is relatively small, such that the hollow portion 23 has a relatively large area, which may reduce a metal overlapping area between the radiation element 100 and the high-frequency radiating element, thereby reducing the diffraction when the high-frequency signal passes through the radiation element 100, and thereby reducing the interference of the radiation element 100 on the high-frequency radiating element. Because the width of at least one of the first radiation arm part 211, the second radiation arm part 212, and the third radiation arm part 213 is not greater than ⅛ of the highest frequency wavelength of the high-frequency band, the radiation element 100 has a relatively narrow profile, allowing high frequency signals to pass through with minimal diffraction.

Figure 5:
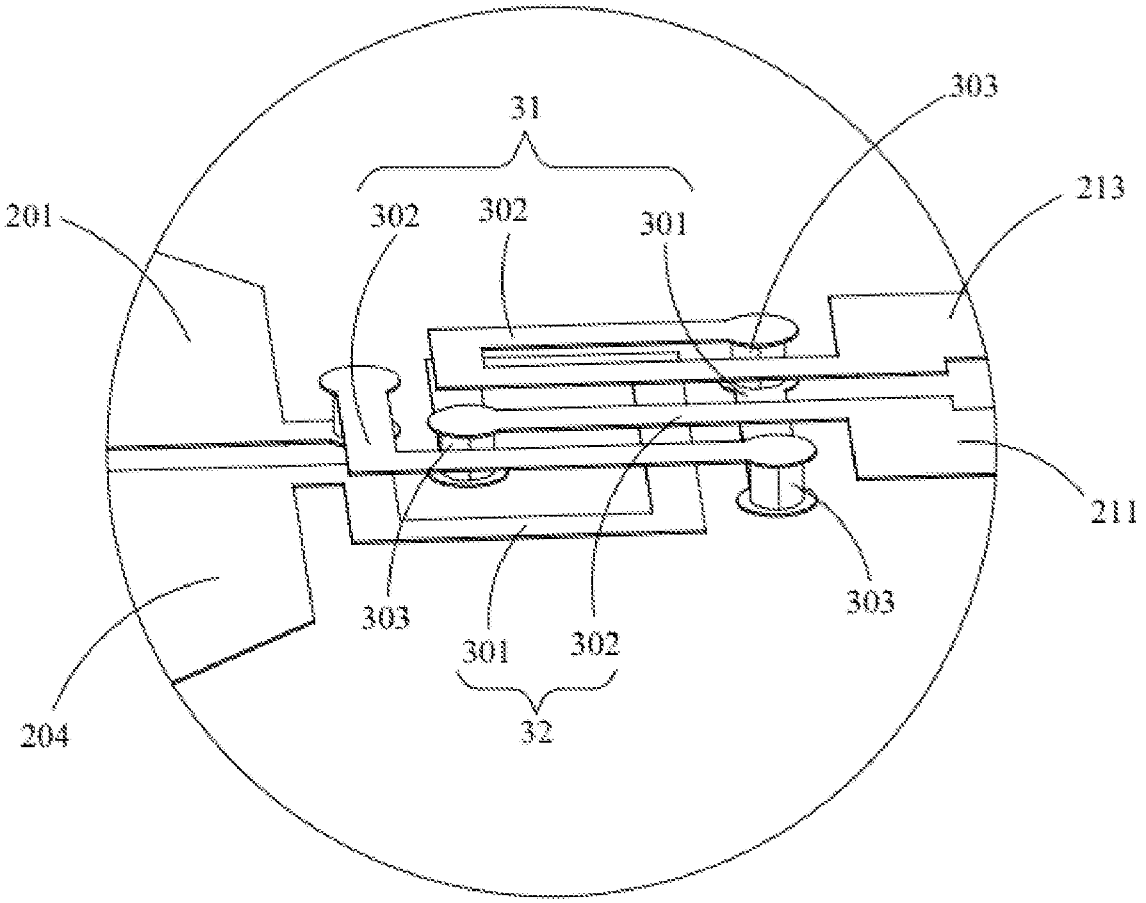
FIG. 5 is a partially enlarged schematic view of circle B in FIG. 4, according to certain embodiment(s) of the present disclosure.
Figure 6:
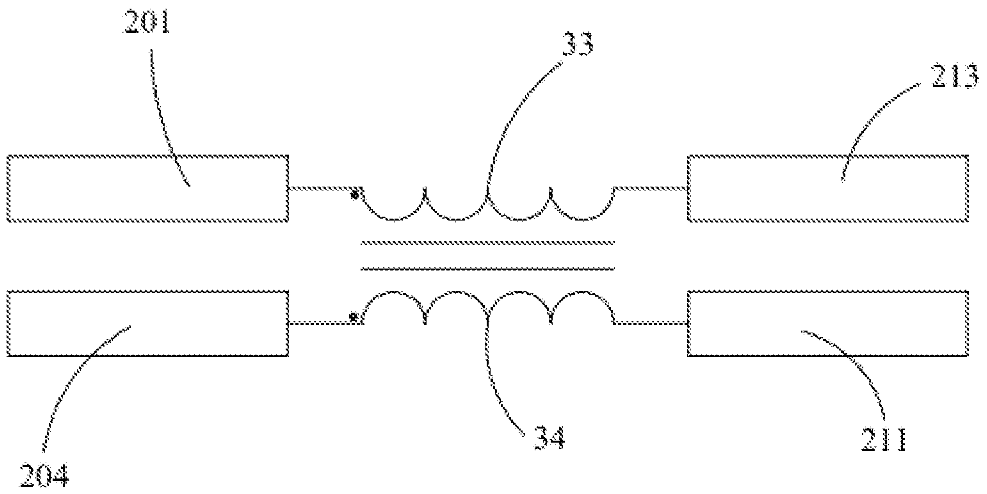
FIG. 6 is a schematic equivalent circuit diagram of a common-mode filter, according to certain embodiment(s) of the present disclosure.

Referring to FIG. 1, FIG. 2 and FIG. 3, the filter 30 is configured between two adjacent radiation arms 21 and two power feeders 22 corresponding to the two adjacent radiation arms 21. When a high-frequency signal passes through the radiation element 100, resonance is generated in two adjacent radiation arms 21, thereby generating high-frequency current. Since the directions of the high-frequency currents in the two radiation arms 21 are the same, the high-frequency currents in the two adjacent radiation arms 21 are common-mode currents. The filter 30 is used for filtering out the common-mode current. In certain embodiment(s), the filter 30 filters out the common-mode high-frequency current, but also filters out any other form of common-mode current. The filter 30 includes a first transmission line 31 feeding power to any given radiation arm and a second transmission line 32 feeding power to another radiation arm adjacent to the any given radiation arm. In certain embodiment(s), the first transmission line 31 and the second transmission line 32 are bent to form an inductance coil, and the first transmission line 31 and the second transmission line 32 have the same winding direction. In certain embodiment(s), the first transmission line 31 and the second transmission line 32 are of the same length. FIG. 5 is a partially enlarged view of circle B in FIG. 4. Referring to FIG. 5, the first transmission line 31 and the second transmission line 32 each include a first trace 301 configured on the first side 11 of the medium panel 10 and a second trace 302 configured on the second side 12 of the medium panel 10. The first trace 301 and the second trace 302 are electrically connected through the conducting hole 303. One end of the first transmission line 31 is connected to power feeder 22 of the radiation area 201, and the other end is connected to the third radiation arm part 213 of the radiation area 201. One end of the second transmission line 32 is connected to the radiation area of radiation area 204, and the other end is connected to the first radiation arm part 211 of the radiation area 204. FIG. 6 is an equivalent circuit diagram of the filter 30. The first transmission line 31 is equivalent to an inductor 33, the second transmission line 32 is equivalent to an inductor 34, and the inductor 33 and the inductor 34 are coupled. In certain embodiment(s), the first transmission line 31 and the second transmission line 32 have the same winding direction and are of the same length, such that when the common-mode current flows through the first transmission line 31 and the second transmission line 32, the directions of the common-mode currents are the same. A magnetic field in the same direction is generated in the coil of the first transmission line 31 and the coil of the second transmission line 32, thereby increasing the inductance of the coil to attenuate the common-mode current and filter out the common-mode current. In certain embodiment(s), the length of the first transmission line 31 and the length of the second transmission line 32 are each not less than ⅛ of the highest frequency wavelength in the high frequency band.

The radiation element 100 works at a low frequency band. Since the radiation element 100 is provided with the filter 30 and/or the shunt filter 214, a maximum size of the radiation element 100 along direction AA (as shown in FIG. 1, the direction AA is a coordinate axis direction of the four-quadrant coordinate system) is not greater than ⅓ of the wavelength of the center frequency in the low frequency band.

In certain embodiment(s), the radiation element 100 according to certain embodiment(s) of the present disclosure is provided with the filter 30 and/or the shunt filter 214, the radiation element 100 may contain and filter out the high-frequency current in the radiation element 100, and thereby reduce interference of the radiation element 100 to the high-frequency radiating element, and so that the high-frequency radiating element has a more desirable radiation pattern.

Figure 9:
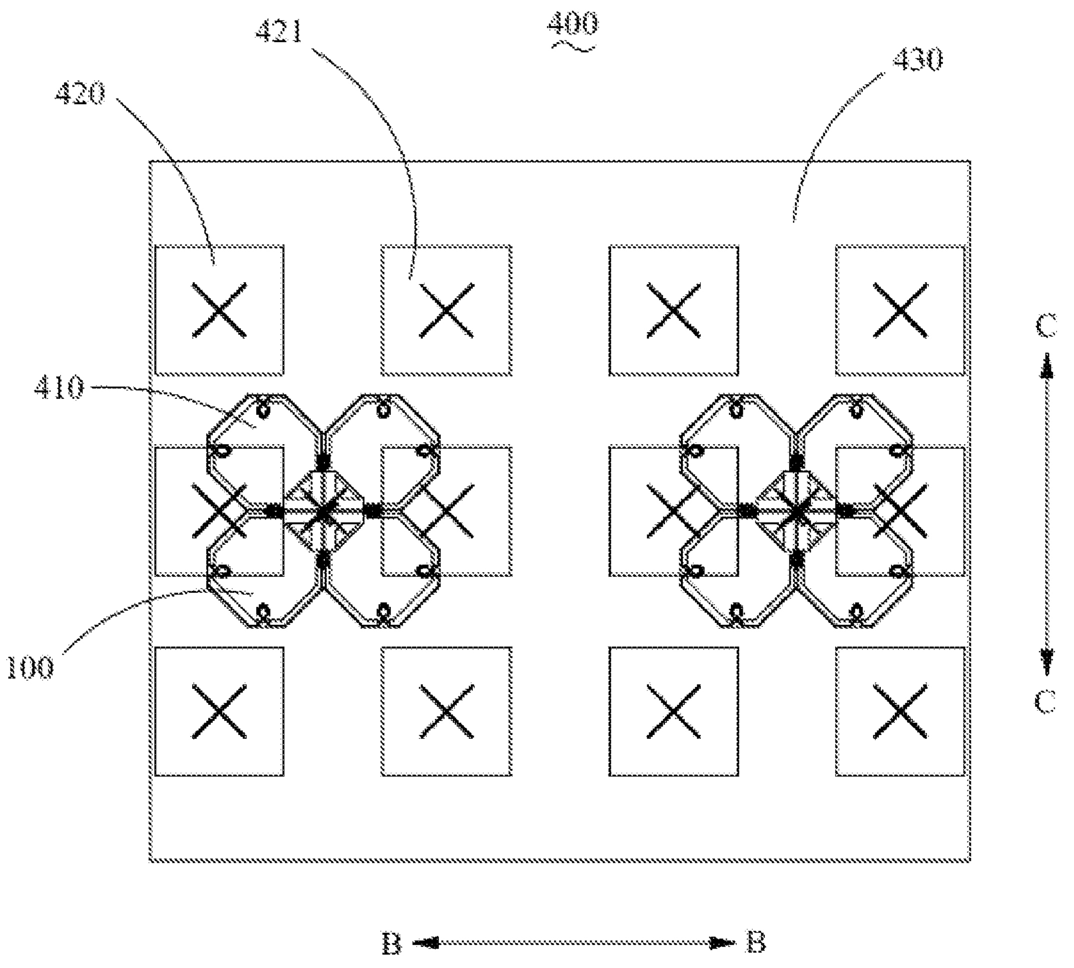
FIG. 9 is a schematic diagram of an antenna according to certain embodiment(s) of the present disclosure.

Referring to FIG. 9, the present disclosure also discloses an antenna 400 including a first radiation unit 410, a second radiation unit 420, and a reflection plate 430. The first radiation unit 410 includes several radiation elements 100, and the radiation elements 100 work in the low frequency band. The second radiation unit 420 includes several high-frequency radiating elements 421, the high-frequency radiating elements 421 work at a high-frequency band, and the working frequency of the high-frequency radiating elements 421 is higher than the working frequency of the radiation element 100. The first radiation unit 410 and the second radiation unit 420 are configured on the reflection plate 430. In a direction perpendicular to the reflection plate 430, the radiation element 100 and the high-frequency radiating element 421 overlap at least partially, and at this time the radiation element 100 and the high-frequency radiating element 421 are positioned at different heights. As shown in FIG. 9, in certain embodiment(s), along a lateral direction BB of the reflection plate 430, two side ends of the radiation element 100 respectively overlap with a high-frequency radiating element. In certain embodiment(s), the lateral direction BB is a horizontal direction. In certain embodiment(s), one side of the radiation element 100 overlaps with a high-frequency radiating element. Since the radiation element 100 is provided with a filter 30 and/or a shunt filter 214, the radiation element 100 and the high-frequency radiating element 421 are arranged with a relatively small distance in-between, such that the radiation element 100 at least partially overlaps the high-frequency radiating element 421, to reduce the width of the antenna 400 along the lateral direction BB. In certain embodiment(s), the filter 30 is a decoupling filter. In certain embodiment(s), when the antenna 400 has two columns of radiation elements 100 and four columns of high-frequency radiating elements 421 along a longitudinal direction CC, the width of the reflection plate 430 in the lateral direction BB is not greater than the lowest frequency wavelength of the low-frequency band. In certain embodiment(s), along the lateral direction BB of the reflection plate 430, a distance between the centers of adjacent high-frequency radiating elements 421 is not greater than the wavelength of the highest frequency in the high-frequency band. In certain embodiment(s), along the longitudinal direction CC of the reflection plate 430, the distance between the centers of adjacent high-frequency radiating elements 421 is not greater than ¾ of the highest frequency wavelength in the high-frequency band. In certain embodiment(s), the wavelength of the center frequency of the high frequency band is λ, and along the lateral direction BB of the reflection plate 430, the distance between the centers of adjacent high-frequency radiating elements 421 is between 0.6λ and λ.

Figure 10:
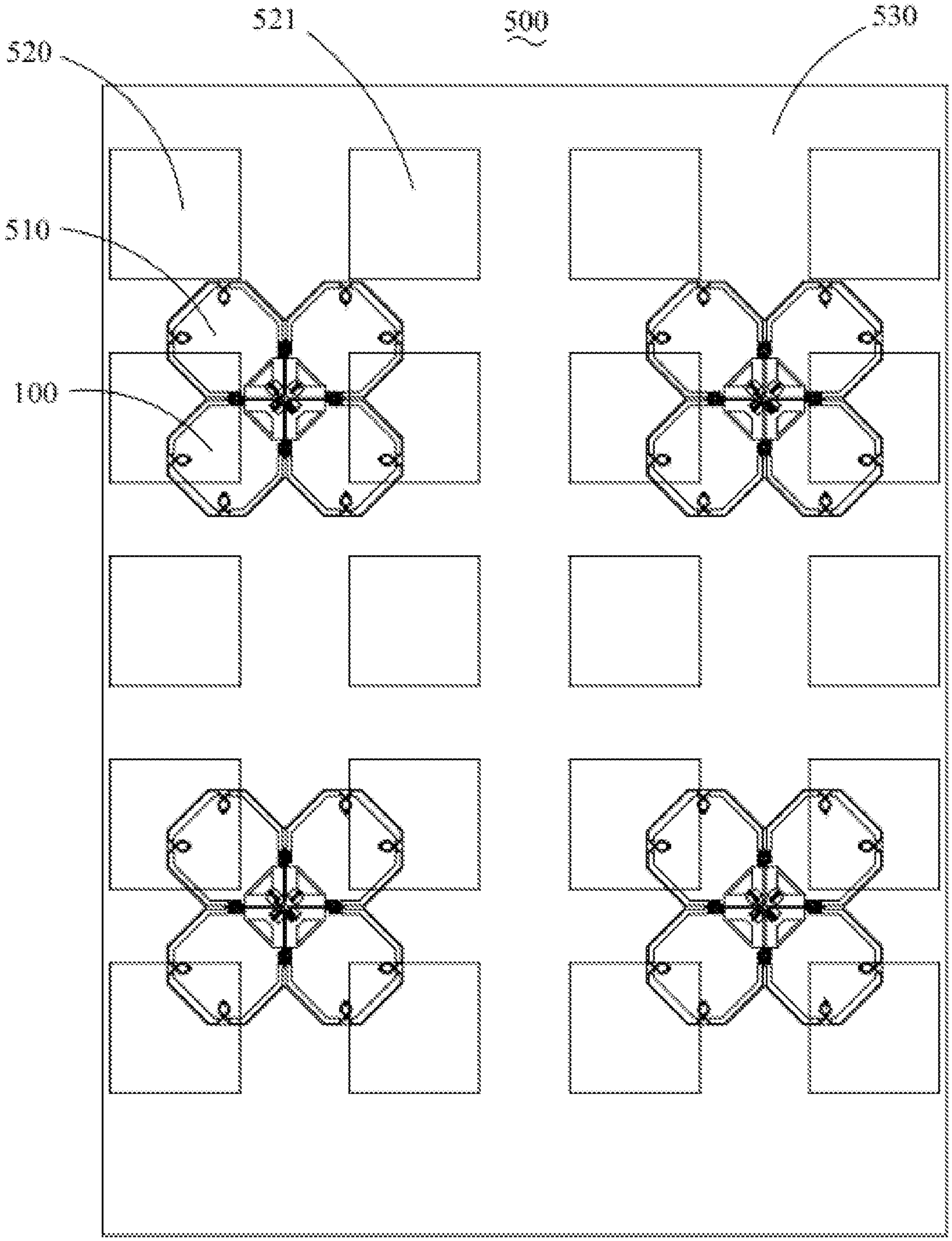
FIG. 10 is a schematic diagram of an antenna according to certain embodiment(s) of the present disclosure.

Referring to FIG. 10, the present disclosure also discloses a second antenna 500, including a first radiation unit 510, a second radiation unit 520, and reflection plate 530. The first radiation unit 510 and the second radiation unit 520 are configured on the reflection plate 530. In certain embodiment(s), the first radiation unit 510 includes several radiation elements 100, and the second radiation unit 520 includes several high-frequency radiating elements 521. In a direction perpendicular to the reflection plate 530, at least one side end of the radiation element 100 overlaps with at least one high-frequency radiating element 521. In certain embodiment(s), two side ends of the radiation element 100 respectively overlap with the two high-frequency radiating elements 521. Such a setting may reduce the height of the second antenna 500 along the longitudinal direction.

The embodiments described herein may be combined as desirable. The description provided herein are direction to certain embodiment of the present disclosure, for those skilled in the art, without departing from the principle of the present invention, improvements and modifications may also be made, and these improvements and modifications are regarded as within the scope of protection of the present disclosure.

What is claimed is:

1. A radiation element, comprising:

two or more radiation arms;

a medium panel, supporting the two or more radiation arms;

two or more power feeders for respectively feeding the two or more radiation arms; and at least one filter, wherein the filter includes a first transmission line and a second transmission line configured between two adjacent radiation arms of the two or more radiation arms and two of the two or more power feeders that correspond to the two adjacent radiation arms, such that one end of the first transmission line is connected to the power feeder that corresponds to one of the two adjacent radiation arms and the other end of the first transmission line is connected to the one of the two adjacent radiation arms, and such that one end of the second transmission line is connected to the power feeder that corresponds to the other one of the two adjacent radiation arms and the other end of the second transmission line is connected to the other one of the two adjacent radiation arms;

wherein each of the two or more radiation arms comprises a shunt filter, the shunt filter includes a third trace configured on one side of the medium panel and a fourth trace configured on an opposing side of the medium panel.

2. The radiation element according to claim 1, wherein at least one of the first transmission line and the second transmission line is not less than ⅛ of a highest frequency wavelength at a high-frequency band.

3. The radiation element according to claim 1, wherein the third trace and the fourth trace each include an intersection area and a non-intersection area, and the intersection areas of the third trace and the fourth trace form a capacitor.

4. The radiation element according to claim 3, wherein a width of the intersection area of the third trace or the fourth trace is not less than 0.5 mm.

5. The radiation element according to claim 1, wherein a width of at least one of the third trace and the fourth trace is smaller than a width of any one of the two or more radiation arms.

6. The radiation element according to claim 1, wherein a dimension of the radiation element is not greater than ⅓ of a center frequency wavelength of a low-frequency band.

7. The radiation element according to claim 1, wherein at least one of the two or more radiation arms includes a first radiation arm part and a second radiation arm part, and the shunt filter is positioned between the first radiation arm part and the second radiation arm part.

8. The radiation element according to claim 7, wherein the at least one of the two or more radiation arms further include a third radiation arm part, and the second radiation arm part is positioned between the first radiation arm part and the third radiation arm part, the first radiation arm part and the third radiation arm part being configured on a first side of the medium panel, and the second radiation arm part being configured on a second side of the medium panel, the second side opposing the first side.

9. The radiation element according to claim 7, wherein the at least one of the two or more radiation arms further include a third radiation arm part, and the first radiation arm part, the second radiation arm part, and the third radiation arm part are configured on a same side of the medium panel.

10. The radiation element according to claim 7, wherein a width of any one of the radiation arm parts is not greater than ⅛ of a highest frequency wavelength of a high-frequency band.

11. The radiation element according to claim 1, wherein each of the two or more power feeders and the corresponding two or more radiation arms together define a hollow portion.

12. The radiating element according to claim 1, wherein at least one of the two or more power feeders includes a bridge.

13. The radiation element according to claim 12, wherein a length of the bridge is not greater than ¼ of a highest frequency wavelength of a high-frequency band.

14. An antenna, comprising:

a first radiation unit, including a radiation element, the radiation element comprising:

two or more radiation arms;

a medium panel, supporting the two or more radiation arms;

two or more power feeders for respectively feeding the two or more radiation arms; and at least one filter, wherein the filter includes a first transmission line and a second transmission line configured between two adjacent radiation arms of the two or more radiation arms and two of the two or more power feeders that correspond to the two adjacent radiation arms, such that one end of the first transmission line is connected to the power feeder that corresponds to one of the two adjacent radiation arms and the other end of the first transmission line is connected to the one of the two adjacent radiation arms, and such that one end of the second transmission line is connected to the power feeder that corresponds to the other one of the two adjacent radiation arms and the other end of the second transmission line is connected to the other one of the two adjacent radiation arms;

wherein each of the two or more radiation arms comprises a shunt filter, the shunt filter includes a third trace configured on one side of the medium panel and a fourth trace configured on an opposing side of the medium panel;

a second radiation unit, including a high-frequency radiating element, a working frequency of the high-frequency radiating element is higher than a working frequency of the radiation element; and a reflection plate, the first radiation unit and the second radiation unit being configured on the reflection plate, wherein, in a direction perpendicular to the reflection plate, the radiation element and the high-frequency radiating element at least partially overlap.

15. The antenna according to claim 14, wherein, in a lateral direction of the reflection plate, the radiation element overlaps with the high-frequency radiating element.

16. The antenna according to claim 14, wherein the high-frequency radiating element is a first high-frequency radiating element, and the second radiation unit further includes a second high-frequency radiating element, and wherein, in a lateral direction of the reflection plate, two sides of the radiation element at least partially overlap with the first and the second high-frequency radiating elements, respectively.

17. The antenna according to claim 14, wherein a width of the reflector plate in a lateral direction is not greater than a lowest frequency wavelength of a low-frequency band.

18. The antenna according to claim 14, wherein the second radiation unit includes a first high-frequency radiating element and a second high-frequency radiating element working at a high-frequency band; and in a lateral direction of the reflection plate, a center-to-center distance between the first and the second high-frequency radiating elements is not greater than a highest frequency wavelength in the high-frequency band.

19. The antenna according to claim 14, wherein the second radiation unit includes a first high-frequency radiating element and a second high-frequency radiating element working at a high-frequency band; and in the longitudinal direction of the reflection plate, a center-to-center distance between the first and the second high-frequency radiating elements is not greater than ¾ of a highest frequency wavelength of the high-frequency band.

20. The antenna according to claim 14, wherein the second radiation unit includes a first high-frequency radiating element and a second high-frequency radiating element working at a high-frequency band;

a center frequency wavelength of the high-frequency band is X; and in a lateral direction of the reflection plate, a center-to-center distance between the first and the second high-frequency radiating elements is between 0.6X and X.

* * * * *